United States Patent
Hillenbrand

(10) Patent No.: US 10,867,591 B1
(45) Date of Patent: Dec. 15, 2020

(54) VEHICLE HORN ASSEMBLY AND METHOD

(71) Applicant: Honda Motor Co., Ltd., Tokyo (JP)

(72) Inventor: Daniel Scott Hillenbrand, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/587,773

(22) Filed: Sep. 30, 2019

(51) Int. Cl.
  *G10K 9/22* (2006.01)
  *G10K 9/20* (2006.01)
  *B60Q 5/00* (2006.01)

(52) U.S. Cl.
  CPC ............. *G10K 9/22* (2013.01); *B60Q 5/00* (2013.01); *G10K 9/20* (2013.01)

(58) Field of Classification Search
  None
  See application file for complete search history.

(56) References Cited

U.S. PATENT DOCUMENTS

| | | | |
|---|---|---|---|
| 3,242,483 A * | 3/1966 | Wetzel | G10K 9/15 340/388.7 |
| 4,998,499 A | 3/1991 | Nordbeck | |
| 5,929,751 A * | 7/1999 | Chatwell | G10K 9/22 116/142 R |
| 6,002,324 A * | 12/1999 | Solow | B60Q 5/00 116/137 R |
| 6,347,823 B1 | 2/2002 | Ozawa et al. | |
| 7,617,794 B2 | 11/2009 | Chlystek | |
| 8,155,363 B2 | 4/2012 | Suzuki | |
| 2008/0238043 A1 * | 10/2008 | Chlystek | G10K 9/22 280/727 |
| 2012/0182317 A1 | 7/2012 | Mansfield et al. | |
| 2013/0094172 A1 * | 4/2013 | Hiroki | H01R 35/025 361/827 |
| 2013/0095672 A1 * | 4/2013 | Hirai | B60R 16/027 439/15 |
| 2014/0009272 A1 * | 1/2014 | Righetto | G10K 9/22 340/404.1 |
| 2014/0015654 A1 * | 1/2014 | Nakayama | B60Q 5/008 340/425.5 |
| 2014/0093112 A1 * | 4/2014 | Solow | G10K 9/12 381/340 |
| 2019/0255994 A1 * | 8/2019 | Christen | H04R 1/22 |

FOREIGN PATENT DOCUMENTS

CN  205150075  4/2016

* cited by examiner

*Primary Examiner* — Curtis J King
(74) *Attorney, Agent, or Firm* — Rankin, Hill & Clark LLP

(57) ABSTRACT

A vehicle horn assembly for installation in one of a first vehicle type and a second vehicle type different than the first vehicle type is provided. The vehicle horn assembly includes a housing common to each of the first vehicle type and the second vehicle type. The housing has a resonance tube provided with a sound outlet portion. A first cover separate from the housing has a first configuration. The first cover is configured to be releasably connected to the housing for covering the sound outlet portion when the housing is to be installed in the first vehicle type. A second cover separate from the housing has a second configuration different than the first configuration. The second cover is configured to be releasably connected to the housing for covering the sound outlet portion when the housing is to be installed in the second vehicle type.

20 Claims, 4 Drawing Sheets

VEHICLE HORN ASSEMBLY AND METHOD

BACKGROUND

A conventional vehicle horn structure includes a housing having a resonance tube or trumpet with a sound outlet. In the conventional vehicle horn, the sound outlet is externally open to perform its function. In certain vehicles, the horns are installed within a body framework, such as to the inner side of fenders next to an engine compartment. With this installed location of the horn, a deflector or cover is provided to cover the sound outlet to protect against the infiltration of debris and water, which can damage the working components of the horn. During assembly, the cover is affixed to the housing so as to be nonremovable from the housing. Further, the dimensions of the horn structure is typically dependent on the type/model of vehicle that the horn is to be installed. Therefore, having multiple types of horn structures for the differing vehicle types is necessary for assembly; however, this also increases assembly and manufacturing costs.

BRIEF DESCRIPTION

According to one aspect, a vehicle horn assembly for installation in one of a first vehicle type and a second vehicle type different than the first vehicle type is provided. The vehicle horn assembly comprises a housing common to each of the first vehicle type and the second vehicle type. The housing has a resonance tube provided with a sound outlet portion. A first cover separate from the housing has a first configuration. The first cover is configured to be releasably connected to the housing for covering the sound outlet portion when the housing is to be installed in the first vehicle type. A second cover separate from the housing has a second configuration different than the first configuration. The second cover is configured to be releasably connected to the housing for covering the sound outlet portion when the housing is to be installed in the second vehicle type.

According to another aspect, a vehicle horn assembly for installation in one of a first vehicle type and a second vehicle type different than the first vehicle type is provided. The vehicle horn assembly comprises a housing having a resonance tube provided with a sound outlet portion. A first cover separate from the housing is configured to selectively cover the sound outlet portion when the vehicle horn assembly is to be installed in the first vehicle type. A second cover separate from the housing is configured to selectively cover the sound outlet portion when the vehicle horn assembly is to be installed in the second vehicle type. The housing includes at least one connector provided at the sound outlet portion for releasably connecting the first cover or the second cover to the housing. The housing is a common component to the first vehicle type and the second vehicle type.

According to another aspect, a method of installing a vehicle horn assembly on one of a first vehicle type and a second vehicle type different from the first vehicle type is provided. The vehicle horn assembly includes a housing common to each of the vehicle types and provided with a resonance tube having a sound outlet portion. The method comprise for the first vehicle type, connecting a first cover to the housing to cover the sound outlet portion, the first cover having a first configuration, and installing the housing together with the first cover on the first vehicle type; and for the second vehicle type, connecting a second cover to the housing to cover the sound outlet portion, the second cover having a second configuration different than the first configuration, and installing the housing together with the second cover on the second vehicle type.

DETAILED DESCRIPTION

Figure 1:
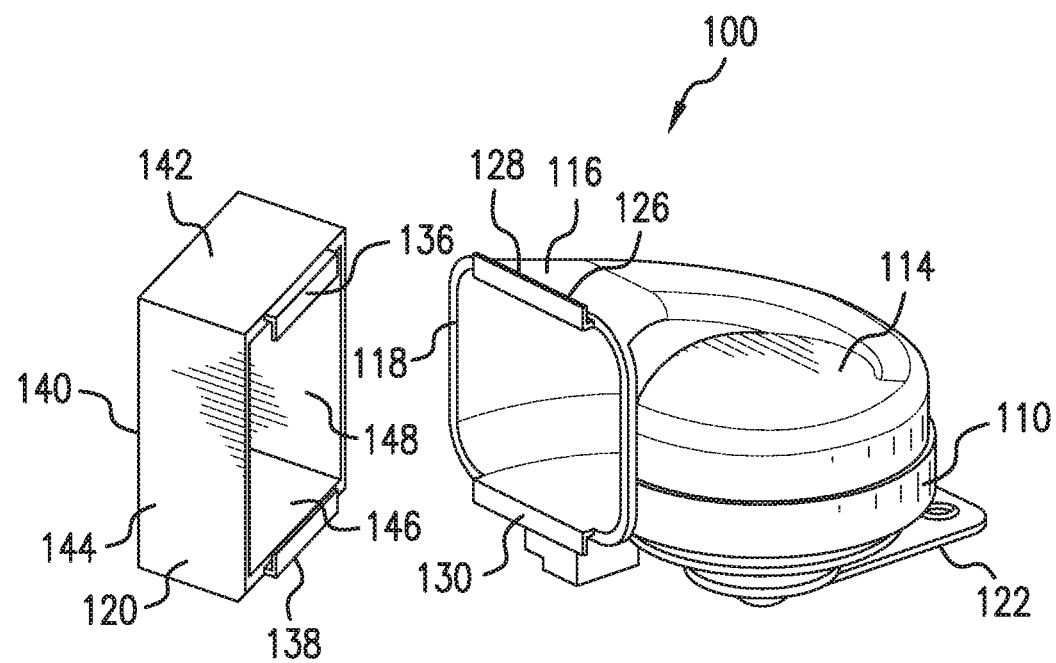
FIG. 1 is a perspective view of a vehicle horn assembly according to the present disclosure, the vehicle horn assembly including a housing and a cover to be releasably connected to the housing.
Figure 2:
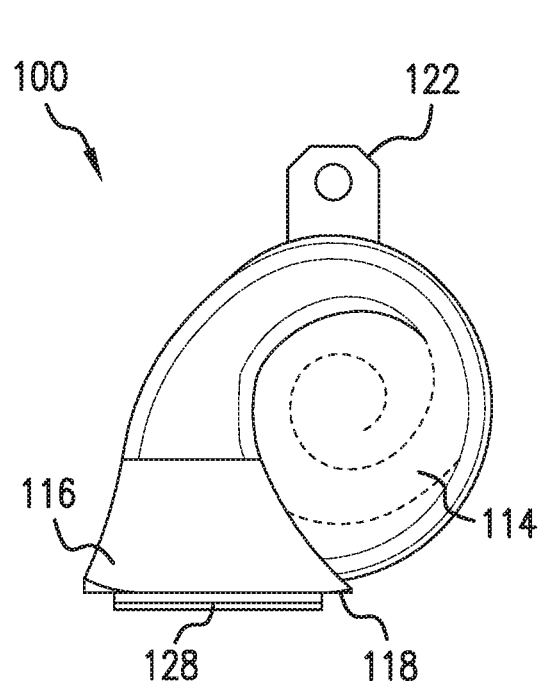
FIGS. 2 and 3 are elevational views of the housing.
Figure 3:
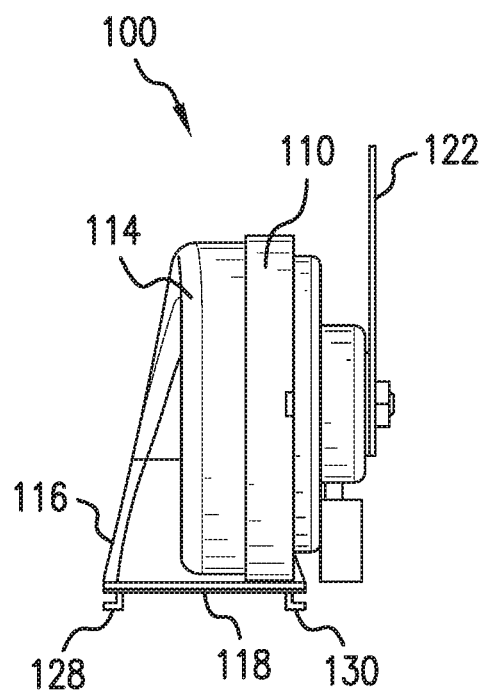

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-3 illustrate a vehicle horn assembly 100 for mounting in each of a first vehicle type 102 (FIG. 8) and a second vehicle type 104 (FIG. 9) that is different from the first vehicle type. The vehicle horn assembly 100 can include a housing 110 for housing a horn or sound generating member (not shown). The sound generating member can be of a conventional construction as is known in the art. The housing 110 further includes a resonance tube or trumpet 114 with a sound outlet portion 116 having an opening 118 to disperse sound generated from the sound generating member. As shown in hidden lines, the resonance tube or trumpet 114 can have a spiraled chamber. A deflector or cover 120 is associated with the resonance tube or trumpet 114 to partially conceal or cover the opening 118. The cover 120 is adapted to restrict ingress of containments (i.e., debris and/or liquid) into the opening 118 while allowing egress of sound from the opening 118. A stay 122 is fixed to the housing 110, and the housing 110 is fixed to each of the first vehicle type 102 (FIG. 8) and the second vehicle type 104 (FIG. 9) by using the stay 122.

According to the present disclosure, the cover 120 is removably connected to the resonance tube or trumpet 114, which allows for ease of assembly and replacement in case of repair. In the depicted aspect, the housing 110 includes at least one connector 126 provided at the sound outlet portion 116 for releasably connecting the cover 120 to the housing. The at least one connector 126 can include at least one slide rail 128 configured to slidingly receive the cover 120. As depicted, the at least one connector 126 includes a pair of slide rails 128, 130 flanking the opening 118 of the sound outlet portion 116. The cover 120 includes a pair of mounts 136, 138 configured to be received by the pair of slide rails 128, 130. This allows the cover 120 to be easily connected to the housing 110. However, it should be appreciated that alternative manners for releasably connecting the cover 120 to the sound outlet portion 116 are contemplated. By way of example, one of the sound outlet portion 116 and the cover 120 can include locking tabs that releasably engage ledges provided on the other of the sound outlet portion 116 and the cover 120. As shown, the cover 120 can include a base wall 140 and sidewalls 142, 144, 146, 148. Each of the sidewalls is coupled to the base wall and can extend toward the sound outlet portion 116. As shown, the mounts 136, 138 are provided on the opposite sidewalls 142, 146. The cover 120 can define at least one opening 150 to direct dispersement of sound from the resonance tube or trumpet 114. In the differing aspects of the cover 120 shown in FIGS. 4-7, the at least one opening 150 extends through the base wall 140; although, this is not required. Further, the cover 120 can be sized and configured to generate a predetermined sound and volume for the vehicle horn assembly 100 that is specific to each of the first vehicle type and the second vehicle type. This allows for the housing 110 together with the resonance tube or trumpet 114 to be a common component to be mounted in each of the first vehicle type and the second vehicle type, with the type of cover 120 specified for that vehicle type being the difference between the as-mounted vehicle horn assemblies.

Figure 4:
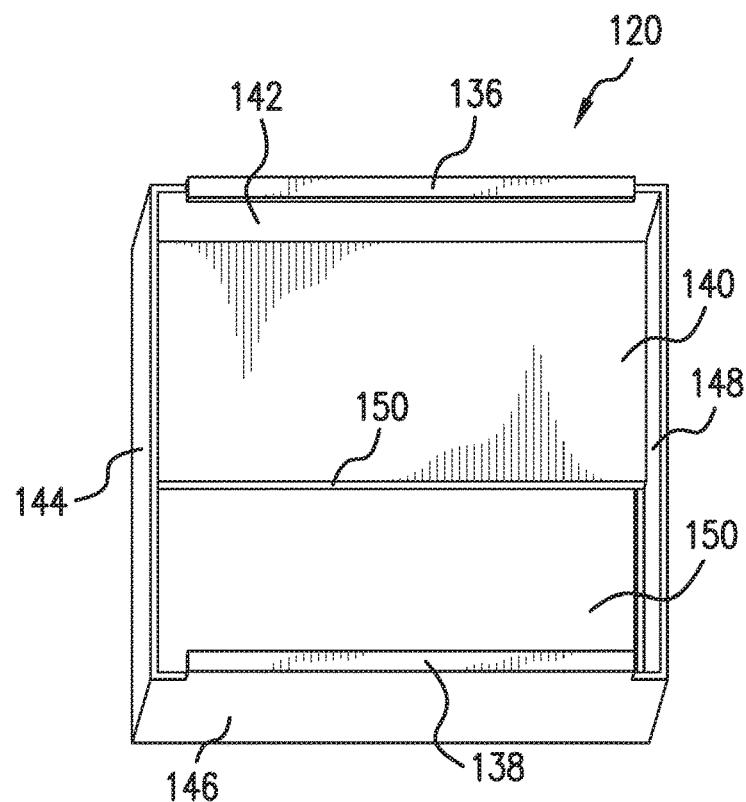
FIGS. 4-7 are inside perspective views of various covers to be releasably connected to the housing.
Figure 5:
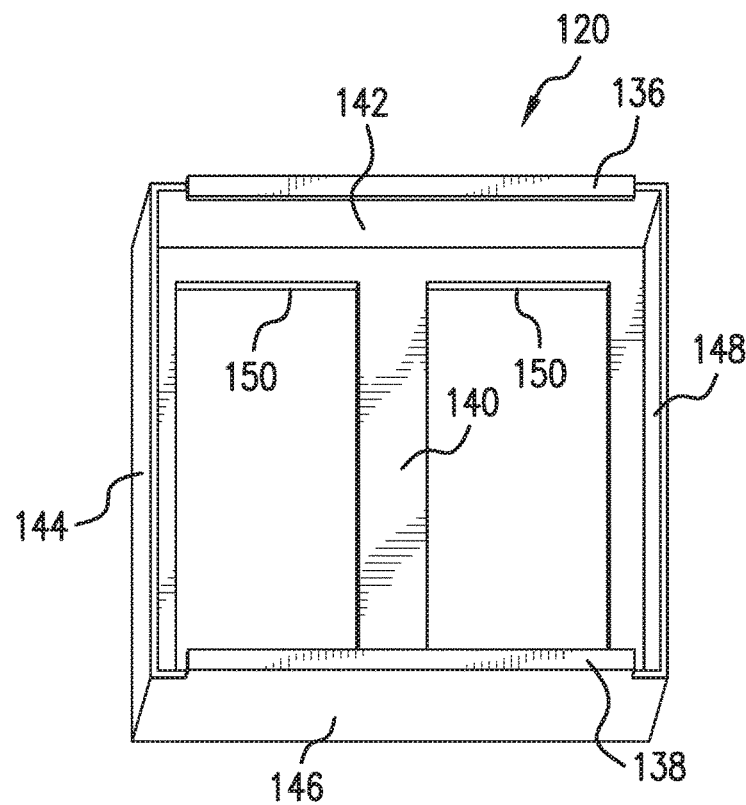
Figure 6:
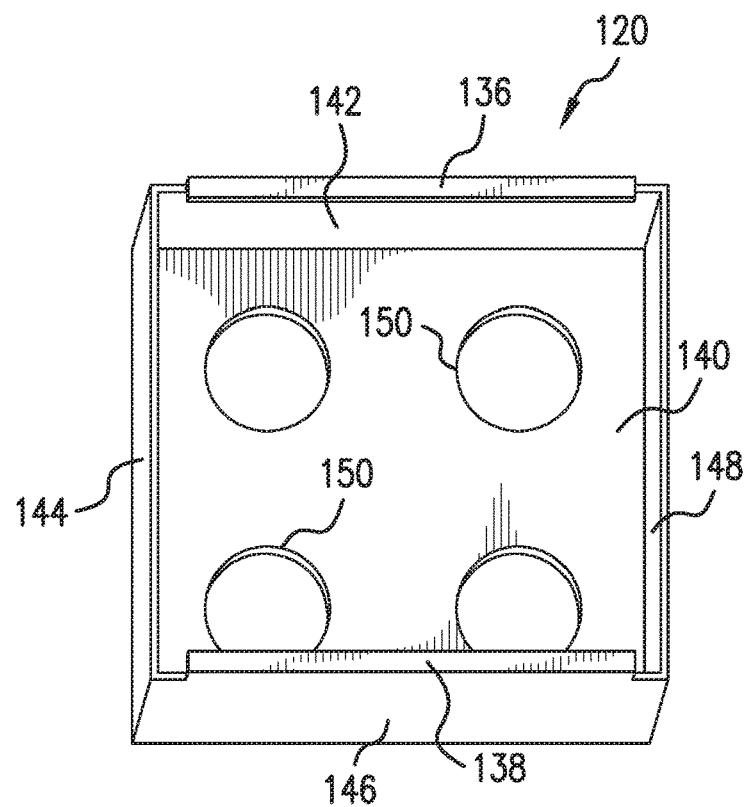
Figure 7:
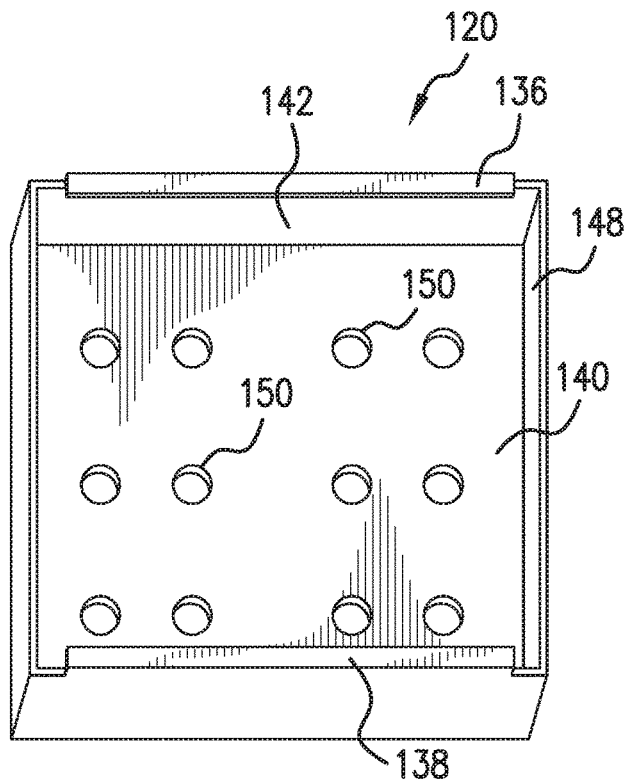

FIGS. 4-7 depict different configurations for the cover 120 that when attached to the sound outlet portion 116 produces a sound quality that can be specified for each of the first vehicle type 102 and the second vehicle type 104. In general, the cover 120 can include the at least one opening 150 configured to have one of a first shape and a second shape different than the first shape, and can include the at least one opening 150 arranged in one of a first pattern and a second pattern different than the first pattern. More particularly, in the aspect of the cover 120 shown in FIG. 4, the at least one opening 150 in the base wall 140 is defined by a single opening 150 that can be offset toward one of the sidewalls (e.g., sidewall 146). The single opening 150 can be rectangular shaped; although, this is not required. In the aspect of the cover 120 shown in FIG. 5, the at least one opening 150 on the base wall 140 is defined by a pair of openings 150 which can be equally dimensioned The pair of openings 150 can be rectangular shaped and can extend along a length of each sidewall 144, 148. In the aspect of the cover 120 shown in FIG. 6, the at least one opening 150 in the base wall 140 is defined by openings (e.g., four circular shaped openings) 150 arranged in a first pattern. In the aspect of the cover 120 shown in FIG. 7, the at least one opening 150 in the base wall 140 is defined by first and second sets of openings 150 each arranged in a second pattern that is different than the first pattern of FIG. 6. Each set of openings can include six circular shaped openings sized smaller than the openings of FIG. 6. It should be appreciated that FIGS. 4-6 are examples of the cover 120 to be attached to the housing 110, and alternative configurations are contemplated. Further, in FIGS. 8 and 9, the cover 120 can extend outwardly from the housing 110 one of a first distance and a second distance greater than the first distance, depending on which vehicle type the housing 110 is mounted. Accordingly, it should be appreciated that the vehicle horn assembly 100 can produce differing sound qualities depending on which of the covers 120 of, for example, FIGS. 4-6 is attached to the housing 110.

Figure 8:
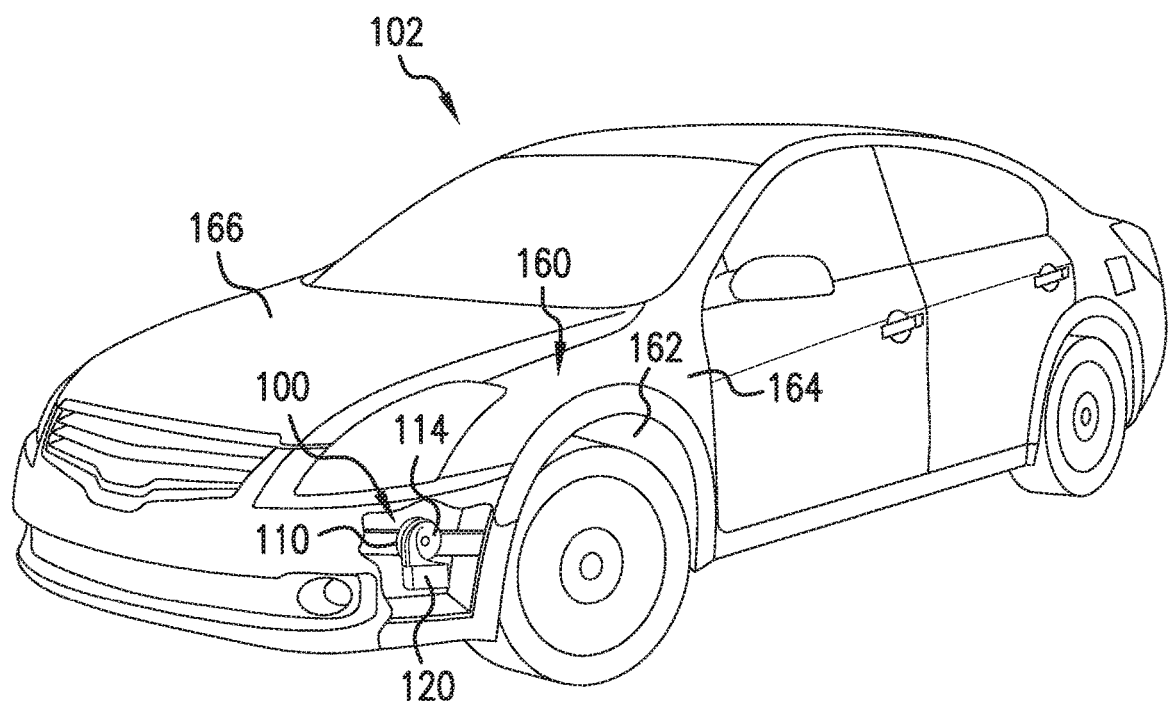
FIG. 8 is a perspective view, partially broken away, of a first vehicle type having attached thereto the housing and one of the covers (i.e., a first cover).
Figure 9:
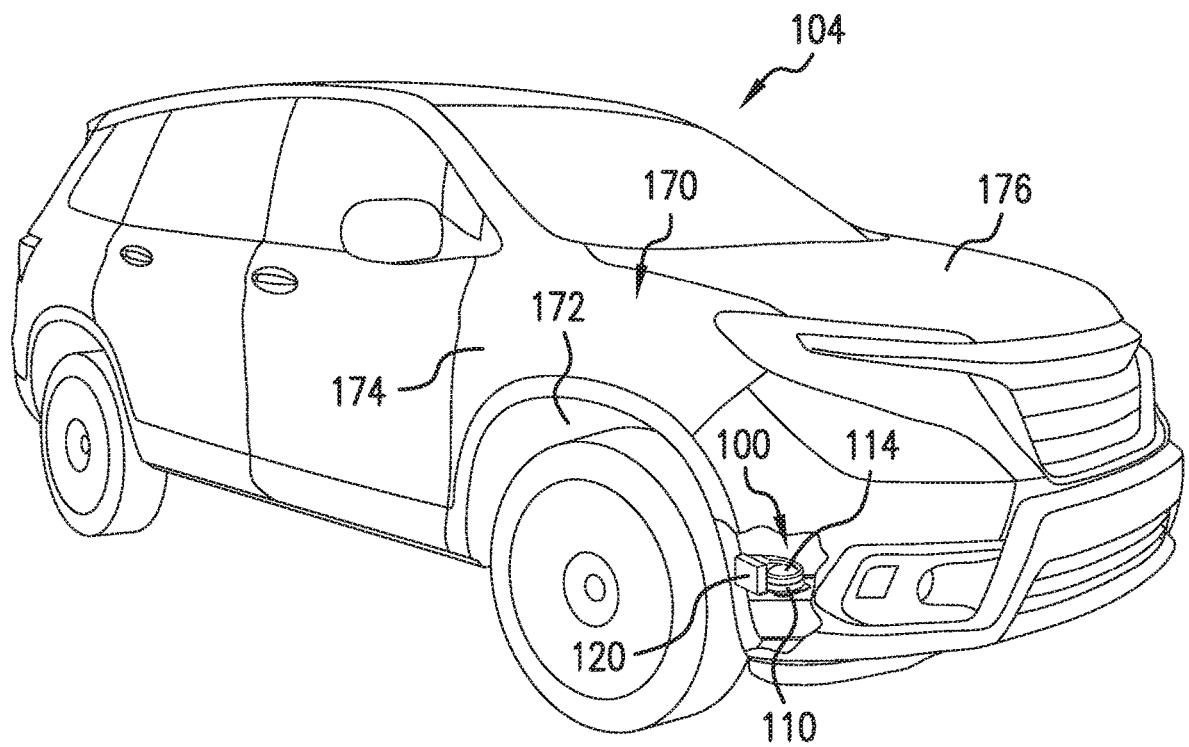
FIG. 9 is a perspective view, partially broken away, of a second vehicle type having attached thereto the housing and another one of the covers (i.e., a second cover).

Referring now to FIGS. 8 and 9, with the different aspects of the cover 120 that can be releasably mounted to the housing 110, the present disclosure allows the housing 110 together with the resonance tube or trumpet 114 to be mounted in each of the first vehicle type 102 and the second different vehicle type 104, with the aspect of the cover 120 to be mounted to the housing 110 specified for that vehicle type. In FIG. 8, the housing 110 and one aspect of the cover 120 (i.e., a first cover) can be located within a body framework 160 of the first vehicle type (i.e., a sedan), particularly in front of a front wheel well 162 and adjacent a side body panel 164 and engine compartment 166. The vehicle horn assembly 100 (i.e., the common housing 110 and first cover 120) is oriented such that the sound outlet portion 116 faces downward. In FIG. 9, the housing 110 and one aspect of the cover 120 (i.e., a second cover) can be located within a body framework 170 of the second vehicle type (i.e., a SUV), particularly in front of a front wheel well 172 and adjacent a side body panel 174 and an engine compartment 176. The vehicle horn assembly 100 (i.e., the common housing 110 and second different cover 120) is oriented such that the sound outlet portion 116 faces forward. In both examples, with the mounting in the front wheel well 162, 172 where the water can enter into the respective engine compartment 166, 176, the first and second covers are adapted to prevent water from entering the sound outlet portion 116 of the housing 110.

Therefore, according to the present disclosure, the vehicle horn assembly 100 for installation in one of the first vehicle type 102 and the second vehicle type 104 different than the first vehicle type is provided. The vehicle horn assembly 100 comprises the housing 110 common to each of the first vehicle type and the second vehicle type. The housing 110 has a resonance tube 112 provided with the sound outlet portion 116. A first cover (i.e., one of the aspects of the cover 120) separate from the housing 110 has a first configuration. The first cover is configured to be releasably connected to the housing 110 for covering the sound outlet portion 116 when the housing 110 is to be installed in the first vehicle type 102. A second cover (i.e., another one of the aspects of the cover 120) separate from the housing 110 has a second configuration different than the first configuration. The second cover is configured to be releasably connected to the housing 110 for covering the sound outlet portion 116 when the housing is to be installed in the second vehicle type 104. The housing 110 includes the at least one connector 126 provided at the sound outlet portion 116 for releasably connecting one of the first cover and the second cover to the housing, again depending of the vehicle type that the vehicle horn assembly 100 is to be mounted. According to one aspect, the first cover can include first openings arranged in a first pattern, and the second cover can include second openings arranged in a second pattern different than the first pattern. According to another aspect, the first cover can include at least one first opening having a first shape, and the second cover can include at least one second opening having a second shape different than the first shape. According to another aspect, the first cover can extend outwardly from the housing 110 a first distance, and the second cover can extend outwardly from the housing 110 a second distance greater than the first distance. Therefore, with the first cover attached to the housing 110 the resonance tube 114 can produce a first sound quality specified for the first vehicle type 102, and with the second cover attached to the housing 110 the resonance tube 112 can produce a second sound quality different than the first sound quality specified for the second vehicle type 104.

Further, the interchangeable covers 120 for the housing 110 can allow for the elimination of other types of vehicle horn assemblies, and can provide tooling for one common housing 110 with interchangeable parts that can vary between the application of the vehicle type and its destination. In addition, the interchangeable covers 120 prevent the replacing of the entire vehicle horn assembly 100 in case of repair, instead allowing for simple replacement of the cover 120. In addition, vehicle assembly will be easier because there will only be one type of housing 110 to be mounted to each of the vehicle types.

As is evident from the foregoing, a method of installing a vehicle horn assembly 100 on one of a first vehicle type 102 and a second vehicle type 104 different from the first vehicle type is provided. The method comprise for the first vehicle type 102, connecting a first cover (i.e., one of the aspects of the cover 120) to the common housing 110 to cover the sound outlet portion 116, the first cover having a first configuration, and installing the housing together with the first cover on the first vehicle type 102. The method comprises for the second vehicle type 104, connecting a second cover (i.e., another one of the aspects of the cover 120) to the common housing 110 to cover the sound outlet portion 116, the second cover having a second configuration different than the first configuration, and installing the housing together with the second cover on the second vehicle type 104. The method includes providing the housing 110 with at least one connector 126 at the sound outlet portion 116 for releasably connecting one of the first cover and the second cover to the housing. The method includes configuring the first cover such that with the first cover attached to the housing 110 the resonance tube 114 produces a first sound quality specified for the first vehicle type 102, and configuring the second cover such that with the second cover attached to the housing 110 the resonance tube 114 produces a second sound quality different than the first sound quality specified for the second vehicle type 104. By way of example, the method includes providing at least one first opening having a first shape for the first cover, and providing at least one second opening having a second shape different than the first shape the second cover.

It will be appreciated that various of the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle horn assembly for installation in one of a first vehicle type and a second vehicle type different than the first vehicle type, the vehicle horn assembly comprising:
   a housing common to each of the first vehicle type and the second vehicle type, the housing having a resonance tube provided with a sound outlet portion;
   a first cover separate from the housing and having a first configuration, the first cover configured to be releasably connected to the housing for covering the sound outlet portion when the housing is to be installed in the first vehicle type; and
   a second cover separate from the housing and having a second configuration different than the first configuration, the second cover configured to be releasably connected to the housing for covering the sound outlet portion when the housing is to be installed in the second vehicle type.

2. The vehicle horn assembly of claim 1, wherein the housing includes at least one connector provided at the sound outlet portion for releasably connecting one of the first cover and the second cover to the housing.

3. The vehicle horn assembly of claim 2, wherein the at least one connector includes at least one slide rail configured to slidingly receive one of the first cover and the second cover.

4. The vehicle horn assembly of claim 3, wherein the at least one connector includes a pair of slide rails flanking the sound outlet portion.

5. The vehicle horn assembly of claim 1, wherein with the first cover attached to the housing the resonance tube produces a first sound quality specified for the first vehicle type, and with the second cover attached to the housing the resonance tube produces a second sound quality different than the first sound quality specified for the second vehicle type.

6. The vehicle horn assembly of claim 5, wherein the first cover includes first openings arranged in a first pattern, and the second cover includes second openings arranged in a second pattern different than the first pattern.

7. The vehicle horn assembly of claim 5, wherein the first cover includes at least one first opening having a first shape, and the second cover includes at least one second opening having a second shape different than the first shape.

8. The vehicle horn assembly of claim 5, wherein the first cover extends outwardly from the housing a first distance, and the second cover extends outwardly from the housing a second distance greater than the first distance.

9. A vehicle horn assembly for installation in one of a first vehicle type and a second vehicle type different than the first vehicle type, the vehicle horn assembly comprising:
   a housing having a resonance tube provided with a sound outlet portion;
   a first cover separate from the housing and configured to selectively cover the sound outlet portion when the vehicle horn assembly is to be installed in the first vehicle type; and
   a second cover separate from the housing and configured to selectively cover the sound outlet portion when the vehicle horn assembly is to be installed in the second vehicle type,
   wherein the housing includes at least one connector provided at the sound outlet portion for releasably connecting the first cover or the second cover to the housing,
   wherein the housing is a common component to the first vehicle type and the second vehicle type.

10. The vehicle horn assembly of claim 9, wherein the second cover has a configuration different than a configuration of the first cover.

11. The vehicle horn assembly of claim 10, wherein the at least one connector includes at least one slide rail configured to slidingly receive one of the first cover and the second cover.

12. The vehicle horn assembly of claim 11, wherein the at least one connector includes a pair of slide rails flanking the sound outlet portion.

13. The vehicle horn assembly of claim 12, wherein each of the first cover and the second cover includes a pair of mounts configured to be received by the pair of slide rails.

14. The vehicle horn assembly of claim 10, wherein the first cover includes at least one first opening having a first shape, and the second cover includes at least one second opening having a second shape different than the first shape.

15. A method of installing a vehicle horn assembly on one of a first vehicle type and a second vehicle type different from the first vehicle type, the vehicle horn assembly including a housing common to each of the vehicle types and provided with a resonance tube having a sound outlet portion, the method comprising:
   for the first vehicle type, connecting a first cover to the housing to cover the sound outlet portion, the first cover having a first configuration, and installing the housing together with the first cover on the first vehicle type; and for the second vehicle type, connecting a second cover to the housing to cover the sound outlet portion, the second cover having a second configuration different than the first configuration, and installing the housing together with the second cover on the second vehicle type.

16. The method of claim 15, including providing the housing with at least one connector at the sound outlet portion for releasably connecting one of the first cover and the second cover to the housing.

17. The method of claim 16, wherein the at least one connector includes at least one slide rail configured to slidingly receive one of the first cover and the second cover.

18. The method of claim 11, wherein the at least one connector includes a pair of slide rails flanking the sound outlet portion, and each of the first cover and the second cover includes a pair of mounts configured to be received by the pair of slide rails.

19. The method of claim 15, including configuring the first cover such that with the first cover attached to the housing the resonance tube produces a first sound quality specified for the first vehicle type, and configuring the second cover such that with the second cover attached to the housing the resonance tube produces a second sound quality different than the first sound quality specified for the second vehicle type.

20. The method of claim 19, including providing at least one first opening having a first shape for the first cover, and providing at least one second opening having a second shape different than the first shape the second cover.

* * * * *